March 20, 1928.
J. LEDWINKA
DOOR FOR AUTOMOBILE BODIES
Re. 16,907
Original Filed Sept. 18 1924
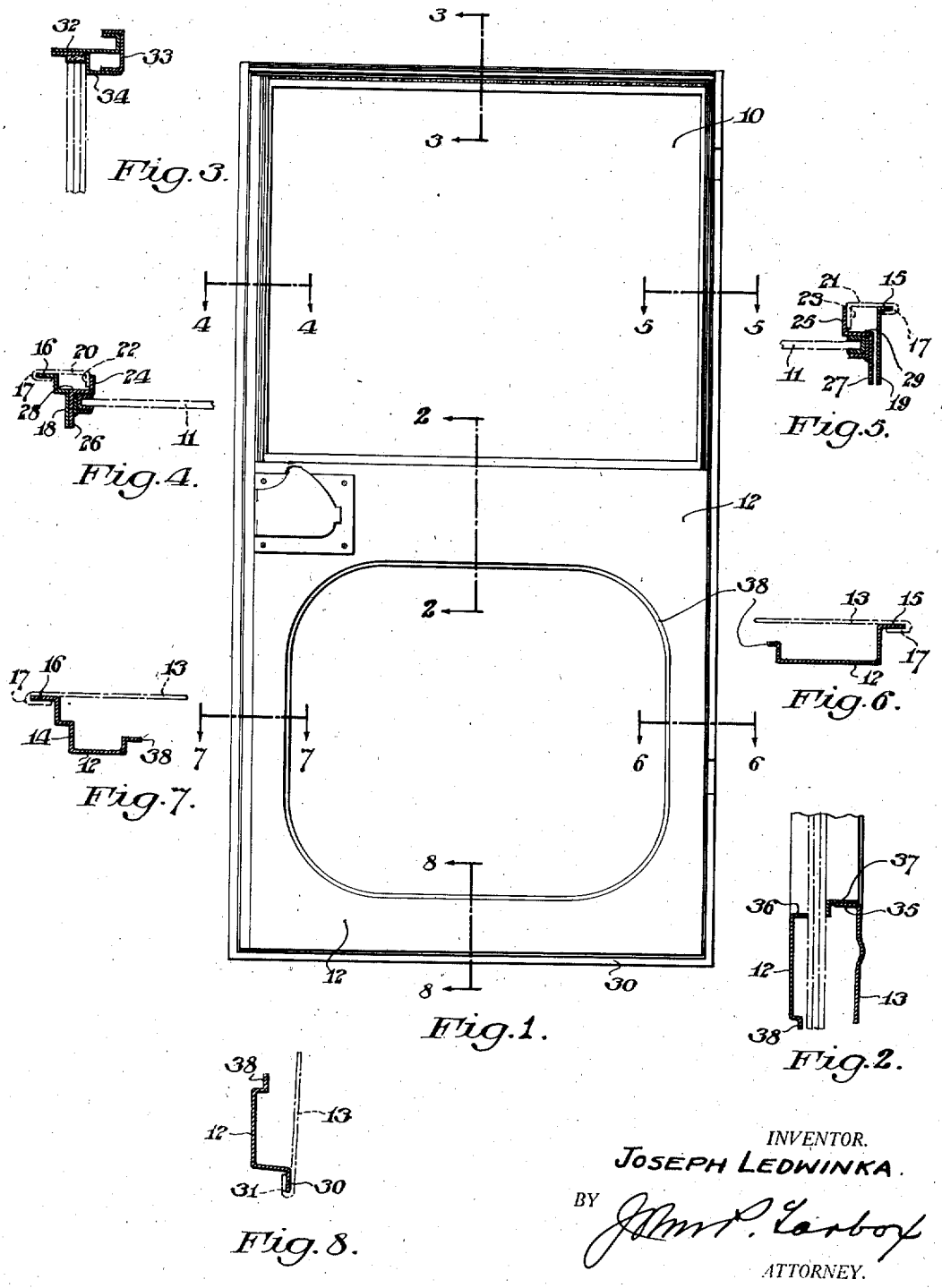
INVENTOR.
JOSEPH LEDWINKA.
BY John P. Carboy
ATTORNEY.

Reissued Mar. 20, 1928. Re. 16,907

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

DOOR FOR AUTOMOBILE BODIES.

Original No. 1,644,680, dated October 11, 1927, Serial No. 738,345, filed September 18, 1924. Application for reissue filed November 3, 1927. Serial No. 231,399.

This invention relates to doors for automobile bodies.

The object of the invention is to provide an improved door structure for automobile bodies, and particularly a door structure for bodies of the closed type, to secure strength and rigidity, while at the same time reducing the weight of the door.

A further object is to provide a door for automobile bodies wherein a window or glass pane slides vertically in guides formed in the sides of the door frame so as to be raised to cover the upper open part of the door frame, or lowered into a closed pocket in the lower part of the door frame and wherein a minimum of width of the sides of the door frame is employed so as to increase to a maximum the range of vision from the interior of the body.

Other objects of the invention will appear more fully hereinafter.

The invention consists substantially in the construction, combination, location and relative arrangement of parts, all as will be more fully hereinafter set forth, as shown in the accompanying drawings, and finally pointed out in the appended claims.

In the drawings:

Fig. 1 is a view in elevation of the inner side or face of a door constructed in accordance with my invention.

Figs. 2, 3, 4, 5, 6, 7 and 8 are broken detail views in section on the lines 2—2, 3—3, 4—4, 5—5, 6—6, 7—7, 8—8, respectively, of Fig. 1.

In automobile bodies, and particularly bodies of the closed type, it is a common practice to employ doors the upper part of which is left open to be occupied by a sliding glass pane when the body is to be closed, which glass pane is lowered into a pocket in the lower part of the door when it is desired to leave the body open for ventilation or otherwise. The purpose of providing the glass pane to fill the opening in the upper part of the door when the body is closed up is to enable the occupant of the closed body to see through the pane. In employing a sliding glass pane for the purpose referred to it is necessary to construct the door frame with side members having tracks or guideways therein to receive the side edges of the sliding pane. It is also desirable that the door frame be made strong, sturdy and rigid, particularly in the upper part thereof, so as to enable the door to stand the shock of the slams and jars, and the stresses and strains to which the doors are subjected when in use. This necessity for securing strength and rigidity in the upper part of the door frame is particularly important in doors for closed bodies not only because the upper part of such frames is open but also because these doors are of considerable size, length and weight, and, therefore, ordinarily, are less able to take and stand the stresses and strains imposed upon them. These necessities have led to the employment of side members of the door frame, particularly in the upper parts thereof, of considerable width and bulk. This, however, is objectionable for the reason that, by reason of their size, width and bulk, they very materially reduce the range of free vision of occupants of the car, whether or not the glass panes are in their raised position. It is among the special purposes of my present invention to provide a door structure for closed automobile bodies which is not only light in weight, but is also strong, rigid and sturdy while at the same time the range of vision of persons occupying the closed body is not materially interfered with by the side members of the door frame.

In carrying out my invention, I propose to employ side door frame structures, which are of minimum width but which, at the same time are of such formation as to secure the desired degree of strength and rigidity.

In the drawings I have shown a door for a closed automobile body, wherein the upper part 10 of the door frame is left open to receive a sliding window pane 11, when raised out of a pocket formed in the lower part of the door by the inner and outer panels 12, 13. The door frame consists of an outer main side rail 14 at the free edge of the door, which is a metal stamping of generally double angle shape in cross section extending the full length of the door. The inner panel 12 for the lower part of the door may, if desired, be stamped out integrally with the lower part of the side rail 14, and hence this panel constitutes a cross connection for the door frame side rails at opposite sides of the door. This inner panel at the hinge edge of the door is formed into a channel and terminates in a lateral edge flange 15, (see Fig. 6), which lies in the same vertical plane with a lateral edge flange 16, which forms the terminal edge for the opposite side of said panel. (See Fig. 7.) The outer panel 13 is flanged at its vertical side edges, over the flanges 15, 16, as indicated at 17 in Figs. 6 and 7, and by reason of the double angle formation of the edges of the inner panel, or of the door frame side rail member 14, the two panels 12, 13 are offset from each other to form a pocket between them into which the window pane is lowered, when not required for use in its raised position. The side rails 14, and the hinge side edge portion of the inner panel 12 are formed with vertical extensions 18, 19, (see Figs. 4 and 5), which respectively constitute portions of the upper part of the door frame at opposite side edges of the door. Likewise the outer panel 13 is formed with vertically extending portions 20, 21, at the side edges thereof. (See Figs. 4 and 5.) These portions 20, 21, are flanged over the edge flanges 15, 16, of the vertically extending portions of the inner panel 12. At their inner vertical edges the outer panel extensions 20, 21, are formed with flanges 22, 23, which are engaged by edge flanges 24, 25 of reinforcing strips 26, 27, which are secured to the extensions 18, 19 of the inner panel 12. These reinforcing strips 26, 27 which are substantially of simple Z section are provided with angles 28, 29 which form with the strips 26, 27, respectively, guides or glass run channels for the edges of the glass pane 11. Any suitable means (not shown) may be used to secure the reinforcing strip 27 in spaced relation to the extension 19, this space, as is best shown in Fig. 5, being provided for the accommodation of the upper door hinge (not shown).

At its lower edge the outer panel is flanged over a bottom edge flange 30 of the inner panel 12, as shown at 31 in Fig. 8.

The extreme upper ends of the side rail structures of the door frame are connected by a tie rail 32, (see Fig. 3), which is a stamping formed into channel shape at its outer edge. Over this channel is engaged a channel shaped outer rail stamping 33, to which is connected an angle shaped stamping 34, which forms a top stop for the glass pane when in its raised position.

At its upper edge the outer panel 13 is formed with a lateral flange 35, and the corresponding edge of the inner panel 12 is provided with an oppositely presenting flange 36, (see Fig. 2). A top rail 37 in the form of an angle shaped stamping is applied to the flange 35, the spacing relation of the flanges 35, 36, being such as to provide for the movement of the glass pane between them when raised and lowered, the angle stamping 37 forming a guide for said pane.

If desired, and in order to reduce the weight of the door, the inner panel 12 may be cut out centrally, as indicated at 38, Fig. 1, the inner surface of this panel being ordinarily covered over by a trim or upholstery.

A door structure such as above described avoids the objections and secures the advantages and benefits above described. It is not only light in weight but it is strong, rigid and sturdy and capable of withstanding the stresses, strains, shocks and jars of usage, and of still greater importance, the side frame structure for the upper open part of the door is very narrow and hence does not materially interfere with the range of vision of occupants of the car.

Having set forth the objects of my invention and a structure embodying the principles thereof, I wish it to be understood that many changes in the specific details of the structures might readily occur to persons skilled in the art and still fall in the scope and spirit of my invention.

What I claim is:

1. In a door rail for closed body vehicles, an angle member, one branch of said angle member constituting the outer overlap of the door and the other branch of said member constituting the vertical edge thereof, a Z-shaped member for reinforcing the upper length of said angle member, said Z-shaped member having a main body web and an inwardly extending arm at one side of said web secured to said angle member, and a second angle member having one branch thereof secured to said inwardly extending arm of said Z member whereby to form a glass run channel between said web and the other branch of said second angle member.

2. In a door rail for closed body vehicles, a double angle member having one portion thereof constituting the outer overlap of the door and another portion thereof constituting the edge of the door, a Z member having a portion thereof joined to said second mentioned portion and a main web at right angles thereto, and an agle member having one branch thereof secured to said Z member whereby to form a glass run channel between the main web of said Z member and the other branch of said angle member.

3. In a door for closed body vehicles, an outer panel, an inner panel, vertically extending angle members at the sides of the inner panel and formed integral therewith to constitute the lower section of the door rails, said angle members projecting a substantial distance above the upper ends of said panels to form the upper section of the door rails, Z-shaped members each having an arm secured to a branch of the upper section of each door rail, and panel strips each having a portion secured to the other arms of said Z members and flanged over the other branches of said angle members, said panel strips being joined to the said outer panel at the lower ends thereof.

4. In a door for closed vehicle bodies, a unitary sheet metal stamping forming the inner panel of the door below the window opening and the laterally extending jamb face portions together with outer peripheral flanges extending laterally from said jamb face portions constituting door rail structures at the sides of the door extending from the bottom to the top of the door.

5. A door rail for closed vehicle bodies, comprising a main transversely extending body portion of web cross section and a reinforcing member of substantially angular section forming a portion of the glass run channel and having one of its arms secured directly to the body web of the rail intermediate the edges of said body web and another arm being extended and joined to the main outer edge of the main body portion of the rail to form a closed box section structure.

6. A door rail for closed vehicle bodies comprising a member of web cross section having a main body extending transversely of the door and an outer laterally extending flange, and a member of substantially angular section forming a portion of the glass run channel and secured through one arm against the inside surface of said transversely extending main body portion of the rail, another arm being extended and secured to the laterally extending flange of the main member of the rail and providing the outer finish of the door rail.

7. A door rail structure for closed vehicle body doors comprising in its upper portion a main transversely extending body of web cross section and sheet metal means forming with said main body a box section structure of a width not substantially exceeding the depth of the glass run channel.

8. A door rail structure for closed vehicle body doors embodying a glass run and comprising a main body having a portion of web cross section arranged at right angles to the plane of the window, and a lateral flange at the outer edge of said web portion, and sheet metal means forming with said main body a box section structure and secured to the main body, respectively, along said flange and at the base of the glass run.

9. A door rail structure for closed vehicle bodies comprising a main transversely extending portion of web cross section forming the jamb face of the door, a glass run applied directly to the inner face of said portion and an outer paneling portion joining the outer edge of the transversely extending portion and a side of the glass run.

10. A door rail structure for closed vehicle body doors comprising in its upper portion a main transversely extending body of web cross section having a shoulder intermediate its edges constituting a door overlap and sheet metal means joined along one edge to the outer edge of the main transversely extending body and along its opposite edge to the main transversely extending body inwardly of said shoulder and forming with said main body a box section structure of a width not substantially exceeding the aggregate of the depth of the glass run and the width of said shoulder.

11. A door rail structure for closed vehicle body doors comprising two members embodying Z section portions, connected together through two adjacent arms of the Z's and having the webs of the Z's extending in opposite directions, one of the Z's forming a portion of the glass run.

12. A top rail structure for closed vehicle body doors comprising two inwardly presenting channel members secured in nested relation, the inner channel being of less width than the outer and having one of its side walls extending inwardly.

13. A top rail structure for closed vehicle body doors comprising two inwardly presenting channels secured in nested relation, the inner channel being of less width than the outer, and the channels each having one of their side walls extended inwardly and one of the extensions being turned over against the other and secured thereto, whereby to form a box section structure.

14. A metal door rail for the doors of closed vehicle bodies of a length extending from the top to the bottom of the door and embodying a main transversely extending portion of web cross section, and an outer door overlap flange and a glass run disposed directly against the inner surface of said transversely extending portion of the rail and secured thereto.

15. A metal rail structure for vehicle doors extending from the top to the bottom of the door and having a main transversely extending body portion of web cross section and a lateral flange at the outer edge of said transversely extending body portion, the inner edge portion of said body portion being disposed substantially perpendicularly to the plane of the door above the bottom of the window opening and extended substantially parallel to the plane of the door below said window opening.

JOSEPH LEDWINKA.